United States Patent [19]

Fontaine et al.

[11] Patent Number: 4,574,739
[45] Date of Patent: Mar. 11, 1986

[54] HORSE EXERCISING DEVICE

[75] Inventors: Lucien P. Fontaine, Bedford; Angelo Leonaggeo, Jr., Bedford Hills, both of N.Y.

[73] Assignee: Swim-Mill, Inc., Camarillo, Calif.

[21] Appl. No.: 286,503

[22] Filed: Jul. 24, 1981
(Under 37 CFR 1.47)

[51] Int. Cl.[4] ............................................. A61D 11/00
[52] U.S. Cl. ...................................... 119/29; 119/158
[58] Field of Search .................................. 119/29, 158

[56] References Cited

U.S. PATENT DOCUMENTS

| 2,848,977 | 8/1958 | Prestrud et al. | 119/158 |
| 3,485,213 | 12/1969 | Scanlon | 119/29 |
| 3,543,724 | 12/1970 | Kirkpatrick et al. | 119/29 |
| 3,543,725 | 12/1970 | Kirkpatrick et al. | 119/29 |
| 3,709,197 | 1/1973 | Moseley | 119/29 |
| 4,165,714 | 8/1979 | Weissman et al. | 119/158 |
| 4,332,217 | 6/1982 | Davis | 119/29 |

Primary Examiner—Hugh R. Chamblee
Attorney, Agent, or Firm—Blum Kaplan Friedman Silberman & Beran

[57] ABSTRACT

An apparatus and method for exercising a horse is provided. The apparatus includes a rectangular tank for holding a pool of water, a vertically adjustable treadmill is lowered into the pool of water so that the effective weight of the horse on the treadmill, may be adjusted. The speed of the treadmill is also adjustable for providing a variable exercise program to control exertion of the horse.

16 Claims, 4 Drawing Figures

HORSE EXERCISING DEVICE

BACKGROUND OF THE INVENTION

Soreness in horses is a common occurrence. In racehorses it results from the long racing season and the hard racing surfaces experienced at some colder temperatures and climates. The tendency to develop soreness or lamenses is increased when for one reason or another, for example soreness after riding or a race, inclement weather, or injury, the horse's regular exercise program is interrupted for several days or longer. Upon returning to the track, a racehorse tends to be keyed up, which can lead to injury or strain. in addition, such periods of lack of exercise cause the horse to lose its wind, legs and/or muscle tone. The lack of exercise, therefore increases the time necessary for the horse to be reconditioned for racing.

Several prior U.S. patents disclose whirlpool and swimming-in-place therapy facilities for relieving injury or soreness in racehorses, such as, U.S. Pat. Nos. 4,165,714, 4,188,329 and 4,236,489. These patents disclose means for lowering a horse into a pool generally equipped with a plurality of whirlpool nozzles positioned in the sidewalls of the facility.

It has been proposed in the past that for periods of time when horses cannot exercise outside, indoor pools be provided in which the horse can swim. Generally, such pools require sloped entrance ramps for the horse to enter and leave the pool, and the ramps and pool take up a considerable amount of space. Alternatively, the horse can be lowered into a water filled tub to swim in place, but this requires expensive and complicated hoist equipment. Such overhead hoists also tend to frighten the horse, are complicated in construction, are difficult to maintain level, and can produce jerking if needed to be stopped during descent.

Aside from these problems, the use of a pool per se has serious drawbacks. First, if the horse is to have an area large enough to swim, the pool requires a significant amount of space, and the pumping, filtering and heating requirements for keeping the pool properly clean and heated are significant. Second, horses are not good natural swimmers, and tending to fear the water, try to reach bottom. This action can lead to injury. Third, swimming pools do not tend to produce useful leg exercise. A horse when in the pool tries to stay afloat by pushing down on its back legs. The muscles used by the horse to try and stay afloat are not those normally used for running, trotting or pacing. Additionally the strifle area of the horse can get sore from this movement. Soreness has also been observed in the shoulder area after swimming. Thus, even if the horse is not injured, little if any useful leg exercise is accomplished. It has also been reported that some horses have ruptured blood vessels in their nostrils due to the nervous reaction of not being able to reach bottom in a pool.

Accordingly, it would be desirable to provide an improved theraputic exercise device to permit a horse to remain in shape physically, yet not aggrivate a leg injury and does not suffer from the shortcomings of the prior art as noted above.

SUMMARY OF THE INVENTION

The present invention is an improved device and method for exercising horses. More particularly, the apparatus according to the invention includes a generally rectangular tank including a treadmill platform having an endless conveyor belt, preferably hydraulically driven, which can be operated at a selected speed so that the horse can be exercised on the treadmill. The device employs a hydraullic lifting mechanism for raising and lowering the platform on which the horse stands out of and into the tank, for adjusting the height of the platform during treadmill use, or for changing the slope of the platform. The tank may include a plurality of water jets in the sidewalls of the tank for applying massage directed to selected areas of the horse. The tank does not require excessive space or amounts of water to be treated, and is effective in allowing hard exercise, without the impact associated with track exercise.

By employing this device, the horse participates in an exercise program without risk or exacerbating injury or soreness. Since the body of the horse is immersed in water, the natural buoyancy of the horse relieves much of the weight on the horse's legs. Accordingly, as the horse runs, paces or trots on the treadmill it does not experience the pounding and stress on the leg joints and muscles that would occur if the horse were running, trotting or pacing on a track. Accordingly, the horse can be exercised even when lame or sore, and immediately after racing. Moreover, even when the horse is not injured, the horse may undergo a regular exercise program indoors without risking injury to the joints or muscles.

As part of the exercise program, the platform and thereby treadmill may be raised or lowered, to either increase or decrease the effective weight of the horse on the treadmill. In all cases, however, the horse will be standing on the treadmill, and will not have to try to swim to stay afloat. Accordingly, the horse will not become scared as may happen in a swimming pool which causes tremendous strain on their lungs.

The hydraulic lift mechanism supports and stabilizes the platform treadmill as it is raised and lowered from the tank. The hydraulic mechanism enjoys the advantages of quiet running, stable and uniform descent or ascent, and the capability of stopping at various heights, without jerking motion as may occur with a hoist-type of mechanism. There are no overhead pulleys, hoists or other moving mechanisms surrounding the horse which could tend to frighten the horse. Also, the hydraulic lift mechanism provides the capability of sloping the treadmill when immersed, if desired.

In this device, as opposed to swimming pools and some other hoist tank arrangements, the horse is walked onto the treadmill, but never sees the water until the platform-treadmill begins its descent. In the even, slow descent, the water level rises only gradually, and if at any stage of the process the horse becomes frightened, the hydraulic mechanism may be stopped while the horse becomes accustomed to the water level. During the entire descent, the horse remains standing on the stationary treadmill, and is never required to swim.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
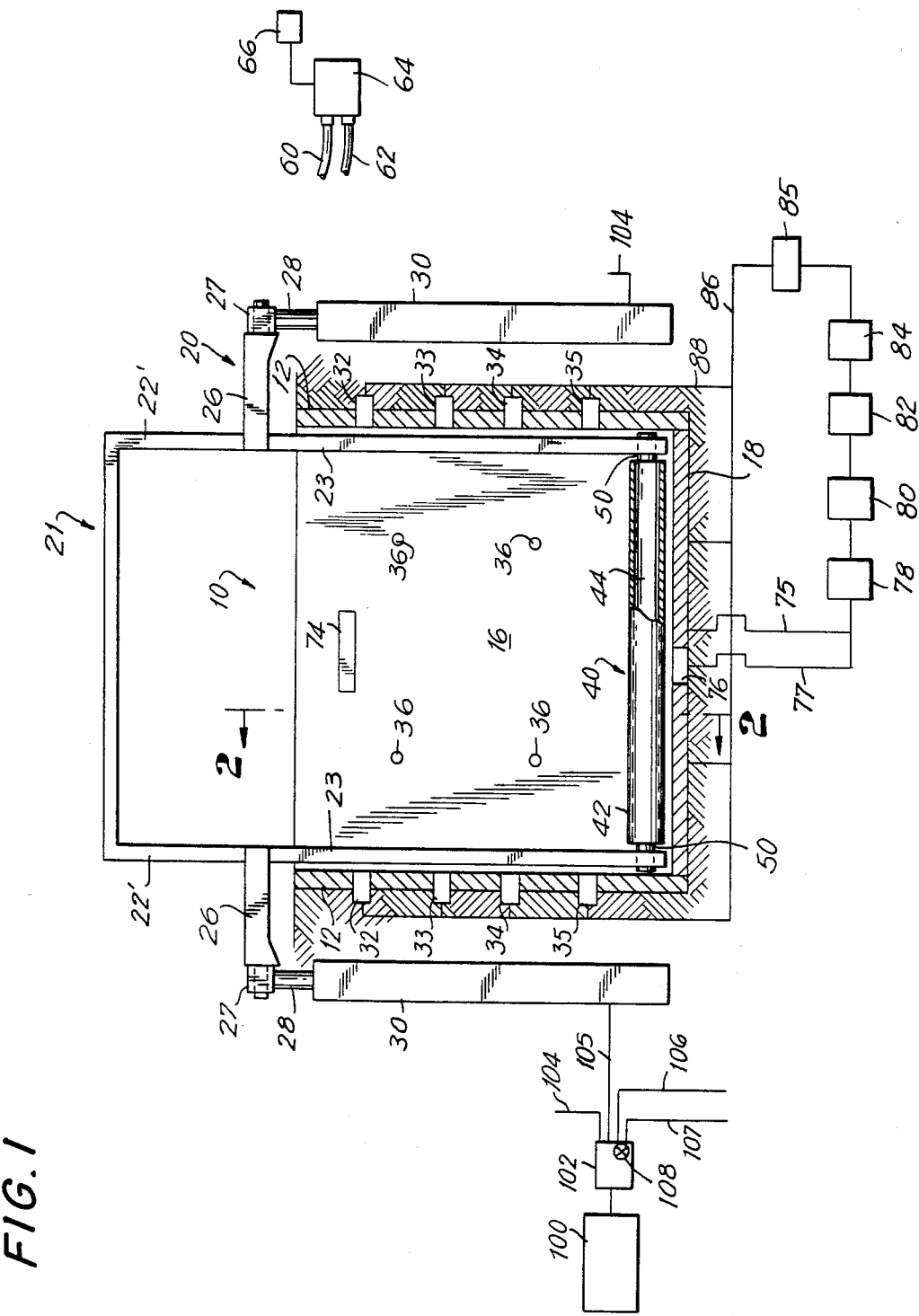
FIG. 1 is a front-sectional view of an exercise device in schematic form, in accordance with the invention.

As shown in FIG. 1, an exercise device in accordance with the invention includes a generally rectangular tank 10 for containing a body of water and an elevator platform structure 20 which may be raised from or lowered into the well of tank 10.

Tank 10 includes opposed upright sidewalls 12, a front wall 14, a back wall 16 and a bottom wall 18. Tank 10 is sized so that a horse may be immersed from approximately its back down without requiring the horse to swim. Elongated sidewalls 12 are straight and substantially parallel and spaced apart by a selected distance, preferably only slightly greater than the width of the horse, plus the room needed for elevator platform structure 20. Preferably, end walls 14 and 16 are spaced apart a distance slightly longer than the length of a horse to minimize the water requirements of the tank 10. The height of side walls 12 and end walls 14 and 16 is selected so that with the elevator platform structure fully descended it enables an average water depth sufficient to reach at least slightly above the haunches of an average racehorse. This depth has been found empirically to be approximately 5 feet, and it enables adequate therapeutic treatment of the lower back and shoulder muscles of the horse. The sidewalls themselves may extend to any convenient height above the horse, although when the walls extend approximately 5½ feet above the bottom, persons located above the horse at the side of the tub can control a horse's head and thereby position, and if necessary calm, the horse during the exercise session.

Figure 2:
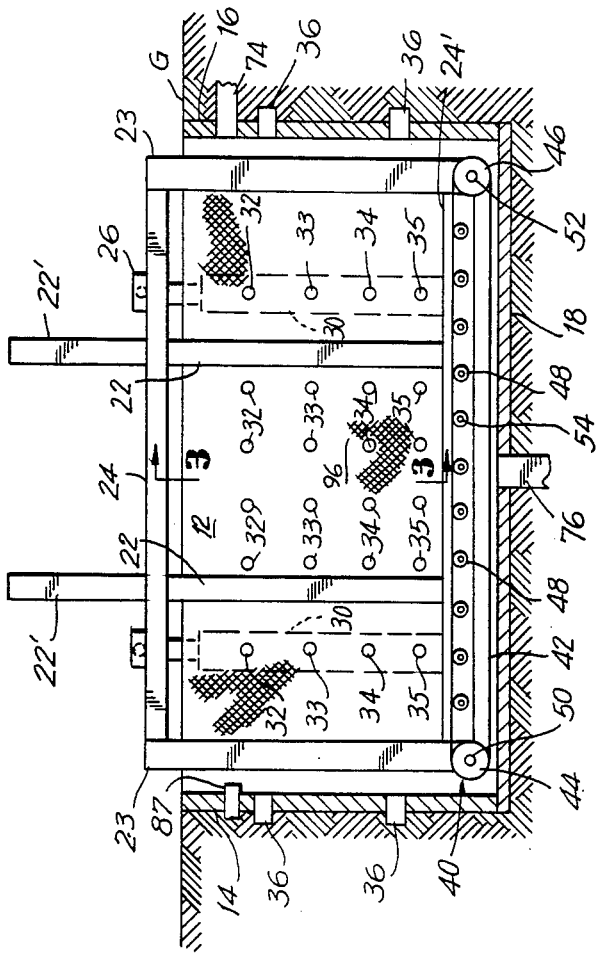
FIG. 2 is a side-sectional view of the device of FIG. 1 taken through lines 2—2.

Elevator platform structure 20 is generally U-shaped, as viewed in FIG. 1, having a plurality of upright beams 22 and 23 and a plurality of longitudinally extending support beams 24 (FIG. 2). Two pairs of support blocks 26 pivotally engage two pair of corresponding mounting blocks 27 on four pistons 28 of four piston and cylinder units 30. As shown in the drawings four piston and cylinder units 30 are provided to effect spaced support of and to stabilize the elevator platform assembly 20. It is within the scope of the invention to use any number of piston and cylinder units as desired, such as two. In this case, one piston and cylinder unit will be disposed on each side of elevator platform structure 20.

Tank 10 is constructed of sturdy fiberglass, or may be made from a wide variety of structural material, such as welded steel plates. The tank is intended to be installed in the ground as shown in FIG. 2, with the top of tank sides 12, 14 and 16 at approximately ground (G) level. A modular-type construction, using either steel or fiberglass panels, facilitates on-site, in ground assembly, although other construction techniques may be utilized. Each of sidewalls 12 of tank 10 may be provided with a plurality of hydrojet nozzles generally indicated by reference numerals 32–35, if desired to impart a whirlpool capability to the device. The nozzles may be arranged in any desired pattern. Each walls 14 and 16 may also be provided with nozzle jets 36 for creating additional turbulence which aids in filtering and cleaning of the water as described in more detail below.

Elevator platform structure 20 includes a treadmill mechanism 40 which forms the bottom of platform structure 20. As shown particularly in FIG. 2, an endless conveyor belt 42 is wrapped around a pair of end pulleys 44 and 46 mounted on a pair of axles 50 and 52, respectively. Belt 42 is supported along its length by a plurality of rollers 48 mounted on a plurality of axles 54. Front and rear axles 50 and 52 extend between upright beams 23, and axles 54 of rollers 48 extend between the lower longitudinal support beams 24', to space apart the beams and complete the U-shape of elevator platform structure 20. Additional transverse reinforcement beams may optionally be welded to lower support beams 24 or to upright members 22 and 23, if desired. For example, additional support to structure 20 is provided by a pair of overhead supports 21 which include a pair of upright beams 22' and a horizontal beam 24' between each pair of piston and cylinder units 30.

Figure 4:
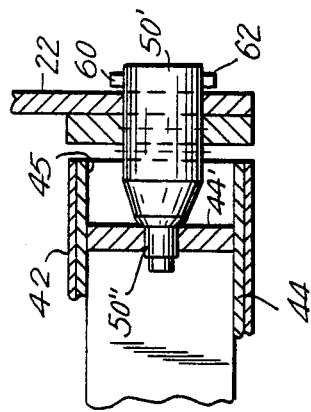
FIG. 4 is an enlarged partial-sectional view of the device of FIG. 1, showing a hydraulic turbine drive mechanism for the elevator platform-treadmill mechanism.

One of the drums, for example rear drum 44, acts as the driving drum for endless belt 42. A pair of flexible hydraulic lines, pressure hose 60 and return hose 62, extend from a hydraulic pump 64 to a hydraulic turbine portion 50+ having an output shaft 50" of front drum 44 (See FIG. 4). Drum 44 is supported about axle 50 at one end, and fixed to output shaft 50" of turbine 50' at the other end. As shown in FIG. 4, turbine 50' is fixed in upright beam 22 and extends into an open end 45 of front drum 44. Rotatable output shaft 50" of turbine 50' is driven by the flow of hydraulic fluid from pressure hose 60. Output shaft 50" is coupled to end wall 44' of front drum 44 for rotating drum 44. The rate of fluid delivery from pump 64, and thereby the volocity of conveyor belt 42, is regulated by a pump control mechanism 66 so that the exercise rate of the horse can be controlled in accordance with a significant embodiment of the invention.

Rear wall 16 of tank 10 is provided with at least one skimmer 74, preferably of the wide-mouth type which acts in a known way to clean the surface of the water of dirt, debris, and other substances that foul the water. The flow rate of the skimmers can be adjusted as desired, between approximately 5 gallons per minute and 50 gallons per minute. One or more main drain outlets 76 are preferably provided in bottom wall 18 of tank 10 to facilitate water recirculation and filtering. Water in a connecting line 77 from each drain 76, as well as an output line 75 from skimmer 74, is pumped via a pump 78 through a particle separator 80 and thereafter through a filtering device 82.

The water may be circulated thorugh a heater 84, if desired to elevate the temperature of the exercise device. Liquid output from separator 80 passes through one or more filter tanks 82 of known variety. The filters act to remove fine debris which is able to pass through particle separator 80. Prior to re-introduction into the tank, the filtered water circulates through water heater 84 which is designed to keep the water entering the tank between about 85° and 110° F. The output from water heater 84 is pumped by a pump 85 to an inlet pipe 86 to a first pair of water inlets 87 at front region of tank 10. If a whirlpool effect is desired, a portion of the water is returned by inlet pipes 88 to water jet nozzles 32-35 and 36 in the sides and end walls of tank 10.

In accordance with one embodiment of the invention, water injected into the tank to create whirlpool turbulencew is mixed at the nozzle head with air for gently massaging the horse's body. Suitable air induction nozzles are manufactured by Hayward Inc. or by Jacuzzi Brothers INc., the latter known as Hydro-Air water massage inlet fittings. Such fittings are commonly employed in swimming pools and health spa whirlpool installations and, accordingly, are not described herein.

In use, the elevator platform structure is raised by forcing fluid into piston-cylinder units 30. Preferably, a hydraulic pump 100 provides fluid from a reservoir (not shown) to a flow divider valve 102 of a known type which provides an equal volume, rather than equal pressure, of fluid to each cylinder 30, through corresponding pressure lines 104, 105, 106, 107. In the illustrated embodiment, lines 104 and 105 provide pressurized fluid to the front cylinders, and lines 106 and 107 lead to the rear cylinders. Accordingly, it is assured, since hydraulic fluid is substantially incompressible, that each of pistons 28 will be raised or lowered the same distance so that platform-treadmill 40 remains level. This may also be used to maintain platform-treadmill 40 at a level pitch if the weight of the horse is forward or back of the center, and at level altitude if the horse is standing off to one side of the platform.

Figure 3:
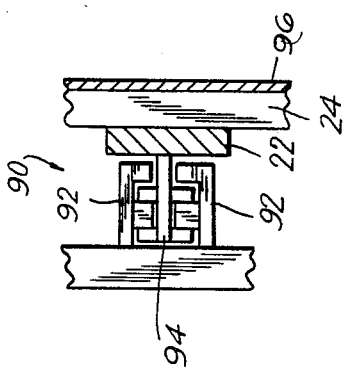
FIG. 3 is a sectional view of a roller guide for the elevator platform guide structure of the device.

As shown in FIG. 3, elevator platform structure 20 may also be assured of being maintained level by providing a plurality of guides 90. Each guide 90 may comprise a track 92 for receiving a roller assembly 94 welded to one upright beam 22. Also, the frame structure formed by means 22, 23, and 24 may be covered by a longitudinally extending mesh or fencing 96. Mesh 96 should have openings so as not to provide any substantial restriction of the flow of water caused by the horse exercising or by injected water from the jets if a whirlpool is utilized. Other forms of guides, however, may be employed.

In order to use the exercise device, platform-treadmill 40 is raised ground level to permit the horse to be walked theron. Hydraulic pump 100 is reversed so that platform-treadmill 40 begins to descend into the water. As the horse is lowered into the water, increased buoyancy tends to reduce the weight of the horse standing on the platform-treadmill 40. However, the horse is always resting on platform-treadmill 40 and is not required to swin. Elevator platform structure 20 may be lowered all the way to the bottom of tank 10, or the height off the bottom may be adjusted for the particular horses or to change the effective weight of the horse resting on the conveyor 42. This is a significant advantage when exercising a horse in the device as the workout may be varied to a desired level. Once platform-treadmill 40 is at the selected height, hydraulic pump 64 is operated such that conveyor belt 42 begins to move. The speed of belt 42 can be adjusted to carry out the desired exercise program, in which the horse walks, trots, paces or runs in the water at a desired speed. Whirlpool jets may be operated simultaneously and the water may be heated. The exercise at a slightly elevated temperature, of about 85° F. for periods of time from about 5 minutes at an initial use to about 30 minutes after a few sessions has been found effective.

By adjusting appropriately the height of platform-treadmill 40 the horse can exercise with little or no pounding on its legs. The device avoids the danger of exercising an injured or sore hose, which if training on a track would tend to favor the uninjured leg and thereby risk further injury. In addition, since the horse is always contacting the bottom, it will not injure its stifle, back or shoulder muscles through fright or by trying to reach bottom by extending its legs. The horse does not, therefore, require long recuperation periods after races, after injury or during the off season, and can continue a regular exercise program even while injured without stress to the injured or sore joints and muscles. At the same time the horse keeps its wind, leg and muscle tone, and the proper muscles used in racing are exercised.

Some exercise programs in indoor pools have been found to cause cramps or exhaustion when horses are not in good physical condition. Accordingly, if desired, as part of a regulated exercise program, the vital functions of the horse can be monitored during the exercise program so that the horse receives the maximum beneficial activity without risk of exhaustion or over-exertion.

The pitch of platform-treadmill 40 can be changed, if desired. To do so, flow equalizer 102 is provided with a valve mechanism 108. When the treadmill is in place on the bottom, valves 108 leading to rear piston/cylinder and cylinder units 30 are closed, and fluid is pumped through lines 104 and 105 leading to the front cylinders only. The forward end of the platform-treadmill 40 is raised slightly, as permitted by the pivotable mounting of support blocks 26 and piston mounting blocks 27. Alternatively, the pitch can be altered by providing variable mounting holes for mounting front drum 44 and rollers 48.

The foregoing represents the preferred embodiments of the invention. Variations and modifications will be apparent to persons skilled in the art, without departing from the inventive concepts disclosed herein. For example, while a four cylinder elevator mechanism has been shown, other arrangements are possible using fewer (or more) cylinders, or even a single cylinder. The guide mechanism for the elevator is merely illustrative and may be modified on even eliminated. Also, other types of drives may be substituted for the hydraulic treadmill drive. All such modifications and variations are intended to be within the scope of the ivention as defined in the following claims.

It will thus be seen that the objects set forth above, among those made apparent from the preceding description, are efficiently attained and, since certain changes may be made in the above method and in the construction without departing from the spirit and scope of the invention, it is intended that all matter contained in the above description of shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for exercising a horse, comprising:
   (a) a rectangular tank having a bottom wall positioned between a pair of upstanding sidewalls;

(b) platform-treadmill including endless belt means for supporting a horse in said tank and for exercising the horse;
(c) treadmill drive means for driving the endless belt means of said platform-treadmill means;
(d) elevator means for raising and lowering said platform-treadmill means on which the horse stands relative to said bottom wall for changing the level of submersion of the horse up to a depth sufficient to reach at least slightly above the haunches of an average race horse and thereby vary the effective weight of the horse on said platform-treadmill means;
(e) a plurality of spaced-apart nozzles in each of said sidewalls; and
(f) means for injecting water into said pool under pressure from selected ones of said nozzles to provide turbulence in said pool for massaging those portions of the body of the horse situated in said tank between said sidewalls.

2. The apparatus of claim 1, wherein the endless belt means of the means is adjustable for adjusting the speed of the platform-treadmill means.

3. The apparatus of claim 1, further including means for adjusting the pitch of said treadmill means for simulating an uphill terrain.

4. The apparatus of claim 1, wherein the treadmill drive means includes a hydraulic turbine coupled to said treadmill means, and means for providing a pressurized fluid to said turbine means for driving said treadmill means.

5. The apparatus of claim 1, wherein said elevator means includes at least 2 piston and cylinder units for maintaining the height of said platform-treadmill relative to the bottom at any desired position within said tank and permit operation of said treadmill drive means at the selected height.

6. The apparatus of claim 1, further including means for injecting water into the pool under pressure to provide turbulence in the pool for massaging the body of a horse situated in said tank between said sidewalls.

7. The apparatus of claim 1, further including means for treating the water contained by said tank to extract debris and other foreign matter therefrom.

8. The apparatus of claim 7, wherein said water treatment means comrises:
at least one drain carried by at least one of said walls;
a pump in fluid flow communication with said drain to extract water and debris from the tank;
at least one of a particle separator device and a filtering device through which water is forced by said pump; and
means for re-introducing said water back into said tank.

9. The apparatus of claim 8, further including means for heating said extracted water to a pre-determined temperature after passage through said one device prior to re-introducing into said tank.

10. A method for exercising a horse comprising:
introducing a horse onto a platform-treadmill means at ground level;
introducing the platform-treadmill means and horse into a pool of water contained within a rectangular tank having a bottom wall positioned between a pair of upstanding sidewalls and a platform-treadmill means displaceable with respect to the bottom wall therein for supporting the horse in the tank;
adjusting the height of the platform-treadmill means with respect to the bottom wall so that a horse is submerged approximately at a desired height for adjusting the effective weight of the horse standing on said platform-treadmill means;
driving said treadmill means to cause the horse to exercise in said pool of water on said driven platform-treadmill means; and
injecting water into said pool in whirlpool fashion for massaging the horse.

11. The method of claim 10, further including the step of fitting the horse with apparatus to monitor the vital functions of the horse, and regulating the speed and height in the water of said platform-treadmill means, and the duration of exercise to control exertion of the horse.

12. The method of claim 10, including the further steps of withstanding water through at least one drain in said tank, pumping said withdrawn water through at least one of a filter and a particle separator for removing contaminates in said water, and thereafter reintroducing said water into said pool.

13. The method of claim 12, further including the step of heating said withdrawn water.

14. The method of claim 10, wherein the steps of adjusting the height of said platform-treadmill means is by an elevator means for raising and lowering said platform-treadmill means, wherein the step of introducing a horse into the pool comprises raising the platform-treadmill means, introducing the horse onto the platform-treadmill means and lowering the horse on the platform-treadmill means vertically into the pool of water.

15. The method of claim 14, wherein the elevator means comprises at least one hyudraulic piston and cylinder unit.

16. Apparatus for exercising and massaging a horse comprising:
(a) a tank for containing a pool of water and having a pair of spaced apart upstanding side wall;
(b) hydraulic elevator means for selectively positioning the horse at one of a plurality of locations within said pool of water between said side walls, said elevator having a treadmill on which the horse stands;
(c) means for driving said treadmill to force the horse to walk on the treadmill at selected speeds;
(d) a plurality of spaced-apart nozzles in each of said side walls; and
(e) means for injecting water into said pool under pressure from selected ones of said nozzles to provide turbulence in said pool for massaging those portions of the body of the horse situated in said tank between said side walls.

* * * * *